US012572194B2

(12) United States Patent
Palo et al.

(10) Patent No.: US 12,572,194 B2
(45) Date of Patent: Mar. 10, 2026

(54) PROCESSOR LOW POWER MODE ENHANCEMENT

(71) Applicant: QUALCOMM Incorporated, San Diego, CA (US)

(72) Inventors: Nigam Mohan Palo, Hyderabad (IN); Sagar Kotte, Hyderabad (IN); Ajeet Tripathi, Satna (IN)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 18/539,201

(22) Filed: Dec. 13, 2023

(65) Prior Publication Data

US 2025/0199599 A1 Jun. 19, 2025

(51) Int. Cl.
| | |
|---|---|
| *G06F 1/32* | (2019.01) |
| *G06F 1/3206* | (2019.01) |
| *G06F 1/3287* | (2019.01) |
| *G06F 1/3296* | (2019.01) |

(52) U.S. Cl.
CPC .......... *G06F 1/3287* (2013.01); *G06F 1/3206* (2013.01); *G06F 1/3296* (2013.01)

(58) Field of Classification Search
CPC ..... G06F 1/3287; G06F 1/3206; G06F 1/3296
See application file for complete search history.

(56) References Cited

U.S. PATENT DOCUMENTS

| | | | | |
|---|---|---|---|---|
| 2012/0110351 A1* | 5/2012 | Raju | ..................... | G06F 1/3296 |
| | | | | 713/300 |
| 2013/0064337 A1* | 3/2013 | Hofmann | .............. | G06F 1/3237 |
| | | | | 375/354 |

* cited by examiner

*Primary Examiner* — Stefan Stoynov
(74) *Attorney, Agent, or Firm* — Loza & Loza LLP

(57) ABSTRACT

Aspects of the disclosure are directed to power management of a processor. In accordance with one aspect, the disclosure is directed towards monitoring a relationship between a performance of a processor and one or more hysteresis levels for generating a hysteresis feedback value based on the relationship; generating a corrected hysteresis level based on the hysteresis feedback value; and adjusting the corrected hysteresis level to generate an adjusted corrected hysteresis level.

24 Claims, 5 Drawing Sheets

| NR | | | | | | LTE | | | | | |
|---|---|---|---|---|---|---|---|---|---|---|---|
| RF State (SNR/MIMO) | | | | | | RF State (SNR/MIMO) | | | | | |
| Layer 2 & 3 Concurrency | | | | | | Layer 2 & 3 Concurrency | | | | | |
| Multi-Mode & Multi-tech | | | | | | Multi-Mode & Multi-tech | | | | | |
| Data | Voice | PDCCH | IDLE | ACQ | INIT | Data | Voice | PDCCH | IDLE | ACQ | INIT |

Modem/RF scenario LUT to QDSP6
SAPCR Hysteresis mapping

| Mode | Hysteresis level |
|---|---|
| Power Mode | L0 (<=20us) |
| Nominal Mode | L1 (20 to 50us) |
| Performance Mode | L2 (70 to 100us) |
| Disable | L3 (>400us) |

FIG. 5

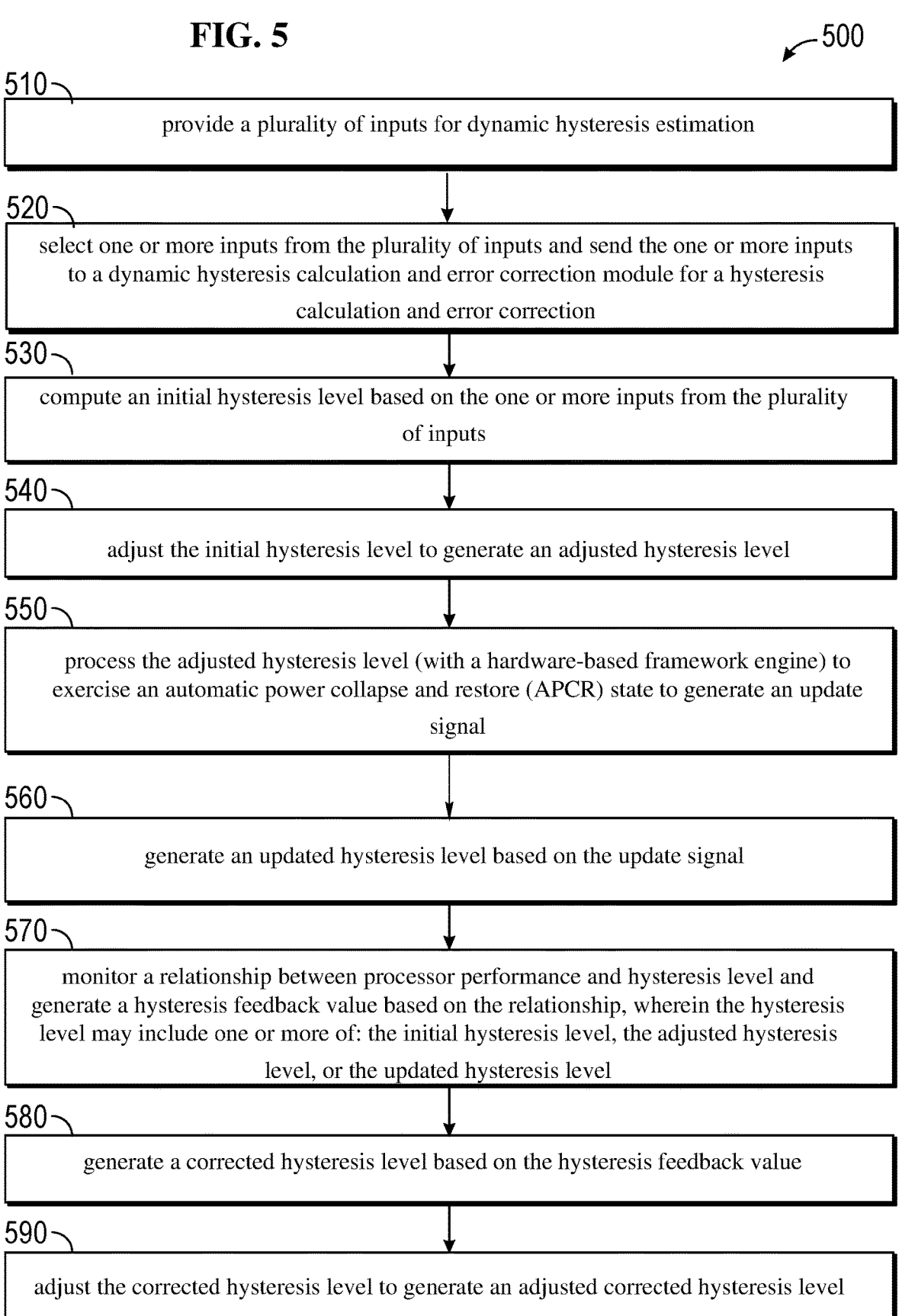

500

510
provide a plurality of inputs for dynamic hysteresis estimation 520
select one or more inputs from the plurality of inputs and send the one or more inputs to a dynamic hysteresis calculation and error correction module for a hysteresis calculation and error correction 530
compute an initial hysteresis level based on the one or more inputs from the plurality of inputs 540
adjust the initial hysteresis level to generate an adjusted hysteresis level 550
process the adjusted hysteresis level (with a hardware-based framework engine) to exercise an automatic power collapse and restore (APCR) state to generate an update signal 560
generate an updated hysteresis level based on the update signal 570
monitor a relationship between processor performance and hysteresis level and generate a hysteresis feedback value based on the relationship, wherein the hysteresis level may include one or more of: the initial hysteresis level, the adjusted hysteresis level, or the updated hysteresis level 580
generate a corrected hysteresis level based on the hysteresis feedback value 590
adjust the corrected hysteresis level to generate an adjusted corrected hysteresis level

PROCESSOR LOW POWER MODE ENHANCEMENT

TECHNICAL FIELD

This disclosure relates generally to the field of information processing systems, and, in particular, to enhancement of dc power consumption and performance in a low power mode of a processor.

BACKGROUND

Information processing systems may include multiple processing engines, processors or processing cores for a variety of user applications. An information processing system may include a central processing unit (CPU), a graphics processing unit (GPU), a digital signal processor (DSP), an image signal processor (ISP), a neural processing unit (NPU), etc., along with input/output interfaces, a hierarchy of memory units and associated interconnection data-buses. In some scenarios, a processor, for example, a digital signal processor (DSP) may operate in a plurality of low power modes to balance processor performance and dc power consumption.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides power management of a processor. Accordingly, an apparatus including a digital signal processor (DSP) configured to receive a power state message and further configured to set a power mode based on the power state message; a central processing unit (CPU) coupled to the DSP, the CPU configured to execute a power management of the DSP and further configured to select the power state message, wherein the power state message includes a hysteresis level; and a memory coupled to the CPU, the memory configured to store data, wherein the data is used to execute the power management.

In one example, the apparatus further includes a power supply, wherein the power supply is housed within the digital signal processor (DSP). In one example, the CPU is further configured to send the power state message to the power supply. In one example, the memory is further configured to store one or more instructions to execute the power management of the digital signal processor (DSP). In one example, the power mode is associated with the digital signal processor (DSP).

In one example, the central processing unit (CPU) is further configured to adjust an initial hysteresis level to generate an adjusted hysteresis level. In one example, the central processing unit (CPU) is further configured to use a hardware-based framework engine to process the adjusted hysteresis level and to exercise an automatic power collapse and restore (APCR) state to generate an update signal. In one example, the central processing unit (CPU) is further configured to generate an updated hysteresis level based on the update signal.

In one example, the central processing unit (CPU) is further configured to monitor a relationship between a performance of the digital signal processor (DSP) and one or more of the following: the initial hysteresis level, the adjusted hysteresis level, the updated hysteresis level. In one example, the central processing unit (CPU) is further configured to generate a hysteresis feedback value based on the relationship. In one example, the central processing unit (CPU) is further configured to generate a corrected hysteresis level based on the hysteresis feedback value. In one example, the central processing unit (CPU) is further configured to adjust the corrected hysteresis level to generate an adjusted corrected hysteresis level. In one example, the hysteresis level is the adjusted corrected hysteresis level.

Another aspect of the disclosure provides a method including monitoring a relationship between a performance of a processor and one or more hysteresis levels for generating a hysteresis feedback value based on the relationship; generating a corrected hysteresis level based on the hysteresis feedback value; and adjusting the corrected hysteresis level to generate an adjusted corrected hysteresis level.

In one example, the method further includes generating an updated hysteresis level based on an update signal. In one example, the method further includes processing an adjusted hysteresis level to exercise an automatic power collapse and restore (APCR) state to generate the update signal, wherein the processing uses a hardware-based framework engine. In one example, the method further includes adjusting an initial hysteresis level to generate the adjusted hysteresis level.

In one example, the one or more hysteresis level includes one or more of the following: the initial hysteresis level, the adjusted hysteresis level and the updated hysteresis level. In one example, the method further includes computing the initial hysteresis level based on one or more inputs from a plurality of inputs. In one example, the method further includes selecting the one or more inputs from the plurality of inputs; and sending the one or more inputs to a dynamic hysteresis calculation and error correction module for a hysteresis calculation and error correction.

In one example, the plurality of inputs includes one or more of the following: a radio access technology, a multi-mode support, a radio resource control (RRC) state, or a type of connected mode for data or voice. In one example, the plurality of inputs includes one or more of the following: a modem steady state case, a modem transient case, an active grant indication, or an access restriction data (ARD) switch-based trigger to physical downlink control channel (PDCCH).

Another aspect of the disclosure provides an apparatus for providing power management of a processor, the apparatus including: means for monitoring a relationship between a performance of a processor and one or more hysteresis levels for generating a hysteresis feedback value based on the relationship; means for generating a corrected hysteresis level based on the hysteresis feedback value; and means for adjusting the corrected hysteresis level to generate an adjusted corrected hysteresis level.

In one example, the apparatus further includes means for processing an adjusted hysteresis level to exercise an automatic power collapse and restore (APCR) state to generate an update signal. In one example, the means for processing is configured to use a hardware-based framework engine to process the adjusted hysteresis level. In one example, the apparatus further includes means for generating an updated hysteresis level based on the update signal.

In one example, the apparatus further includes means for adjusting an initial hysteresis level to generate the adjusted hysteresis level; and means for computing the initial hysteresis level based on one or more inputs from a plurality of inputs, wherein the plurality of inputs includes one or more of the following: a radio access technology, a multimode support, a radio resource control (RRC) state, a type of connected mode for data or voice, a modem steady state case, a modem transient case, an active grant indication, or an access restriction data (ARD) switch-based trigger to physical downlink control channel (PDCCH). In one example, the one or more hysteresis level includes one or more of the following: the initial hysteresis level, the adjusted hysteresis level and the updated hysteresis level.

Another aspect of the disclosure provides a non-transitory computer-readable medium storing computer executable code, operable on a device including at least one processor and at least one memory coupled to the at least one processor, wherein the at least one processor is configured to implement power management of a processor, the computer executable code including: instructions for causing a computer to monitor a relationship between a performance of a processor and one or more hysteresis levels for generating a hysteresis feedback value based on the relationship; instructions for causing the computer to generate a corrected hysteresis level based on the hysteresis feedback value; and instructions for causing the computer to adjust the corrected hysteresis level to generate an adjusted corrected hysteresis level.

In one example, the non-transitory computer-readable medium further includes: instructions for causing the computer to generate an updated hysteresis level based on an update signal; instructions for causing the computer to process an adjusted hysteresis level to exercise an automatic power collapse and restore (APCR) state to generate the update signal, wherein the processing uses a hardware-based framework engine; and instructions for causing the computer to adjust an initial hysteresis level to generate the adjusted hysteresis level.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 4 illustrates an example of a mapping from a modem and RF section scenario to a hysteresis level configuration.

FIG. 5 illustrates an example flow diagram for power management of a processor.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An information processing system, for example, a computing system with multiple slices (e.g., processing engines) or a system on a chip (SoC), may require multiple levels of coordination or synchronization. In one example, a slice may include a processing engine (i.e., a subset of the computing system) as well as associated memory units and other peripheral units. In one example, execution of an application may be decomposed into a plurality of work tasks which are executed by multiple slices or multiple processing engines. Processor performance improvement may be attained with an enhanced hysteresis in the plurality of low power modes.

Figure 1:
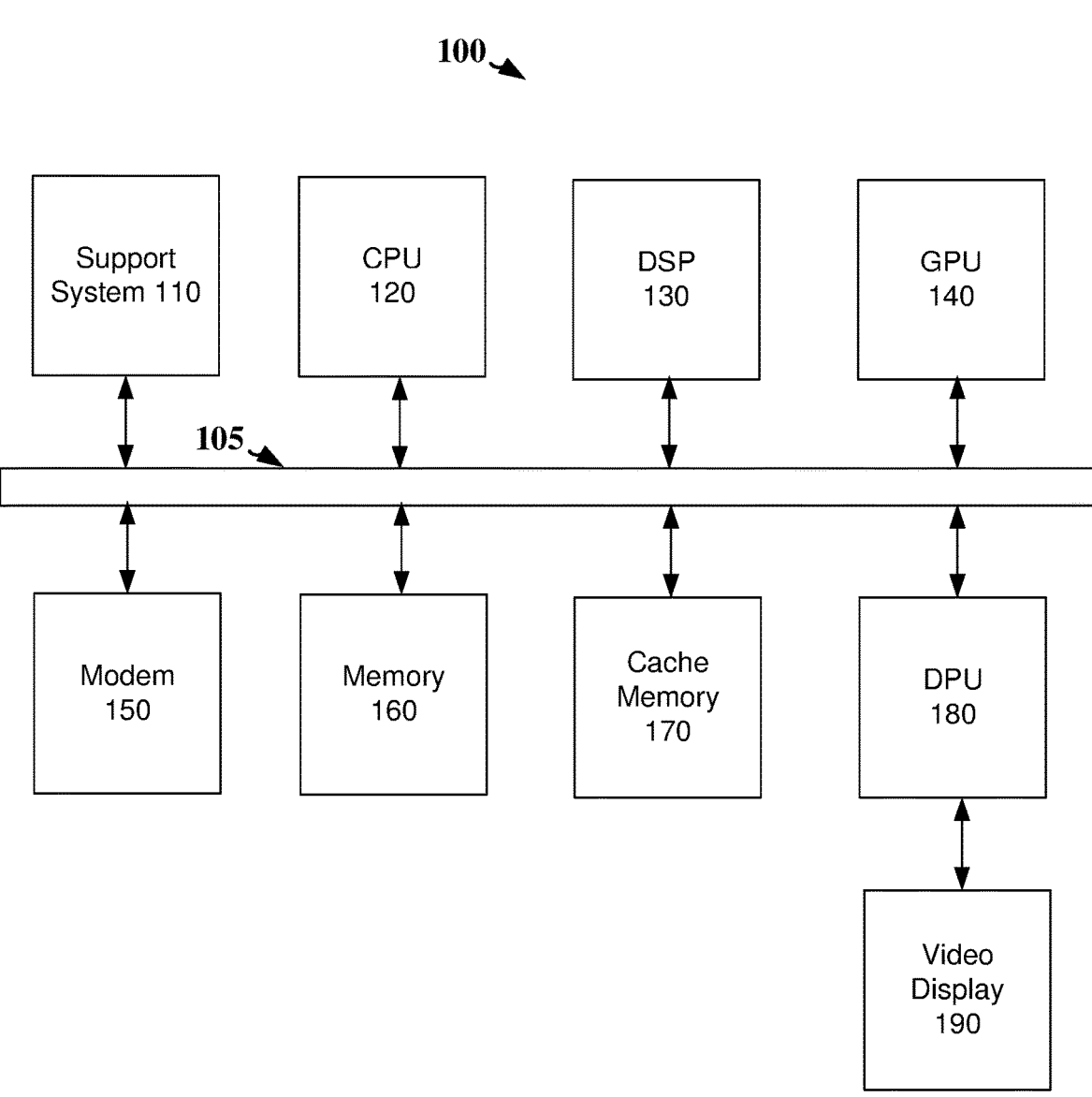
FIG. 1 illustrates an example of an information processing system.

FIG. 1 illustrates an example of an information processing system 100. In one example, the information processing system 100 includes a plurality of processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information.

For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory (i.e., a dedicated memory) which is not shared with the other processing engines. Although several components of the information processing system 100 are included herein, one skilled in the art would understand that the components listed herein are examples and are not exclusive. Thus, other components may be included as part of the information processing system 100 within the spirit and scope of the present disclosure. In one example, the support system 110, the CPU 120, the DSP 130, the GPU 140, the modem 150, the memory 160, the cache memory 170, the DPU 180, the video display 190, etc. each include an internal power supply which responds to power state messages sent by the CPU 120 for power management. In one example, a power state message is a group of information bits which conveys an intended configuration for a power state in a processor. For example, the power state represents a configuration of on/off states for a plurality of components within the processor.

In one example, a processing engine, for example, the DSP 130, in the plurality of processing engines in the information processing system 100 may include a plurality of low power modes. In one example, operation of the processing engine (e.g., DSP 130) may transition among the plurality of low power modes to enable an entry into a power state which provides a variable balance between processor performance and dc power consumption. For example, one power state may be optimized for better processor performance at the expense of dc power consumption. For example, another power state may be optimized for lower dc power consumption at the expense of processor performance. In one example, lower dc power consumption may result in an extended battery operation prior to recharging.

In one example, the information processing system 100 may be part of a wireless device in a wireless communication system. For example, the wireless communication system may conform to a wireless network protocol such as 4G LTE (long term evolution), 5G NR (new radio), etc.

In one example, the following Table 1 illustrates an example of a plurality of low power modes for a processing engine (e.g., the DSP 130).

TABLE 1

| Low power mode (LPM) state | Description |
| --- | --- |
| Processor idle | Clock gating |
| LCG | Long clock gating |
| Short automatic power collapse and restore (SAPCR) | Clock gating + core power collapse (on the order of microseconds) |
| Long automatic power collapse and restore (LAPCR) | Clock gating + core power collapse + System on chip sleep allowed (on the order of milliseconds) |
| Off | Logic and memory power collapse |

In one example, clock gating means a temporary cessation of clock operation applied to a portion of a processing engine or to the entire processing engine. In one example, power collapse means a temporary cessation of dc power supplied to a portion of a processing engine or to the entire processing engine to extend battery life. In one example, power restore means a reapplication of dc power supplied to the portion of the processing engine or to the entire processing engine. For example, lower dc power consumption results in an extended battery operation prior to recharging.

In one example, automatic power collapse and restore (APCR) has two states: short APCR (SAPCR) state and long APCR (LAPCR) state. In one example, short APCR state (SAPCR state) is entered as a power state for shorter sleep periods, for example, on the order of microseconds. In one example, long APCR state (LAPCR state) is entered as a power state for longer sleep periods, for example, on the order of milliseconds.

In one example, entry into short automatic power collapse and restore (SAPCR) state may be modified by adding hysteresis to generate a modified SAPCR state. In one example, hysteresis is a dynamic state characteristic where a current output state depends on a current input state and on a state history. For example, the state history includes input states prior to the current input state and output states prior to the current output state. In one example, hysteresis introduces a lag (or latency) in state changes of the output state relative to state changes of the input state. That is, hysteresis results in a delay of an effect (e.g., output) in response to a change of a stimulus (e.g., input). In one example, when the output state changes in response to the input state change (i.e., after a delay), a hysteresis expiration occurs. That is, a hysteresis expiration means that the lag in state changes has transpired.

In one example, the modified SAPCR state may be entered from the processor idle state if there is no veto from modem offline (e.g., firmware) clients and a hysteresis expiration occurs. That is, if there is a veto from any of the modem offline clients, then the modified SAPCR state will not be entered. In one example, the dynamic state characteristic of hysteresis may be implemented with a proper balance of processor performance and dc power consumption. For example, if the hysteresis introduces a relatively short lag, unnecessary entries into a sleep state may occur and there may be a penalty in a time/power penalty. For example, if the hysteresis introduces a relatively long lag, there may be a lost opportunity for dc power savings.

Figure 2:
FIG. 2 illustrates an example of a state transition diagram.
Figure 2:
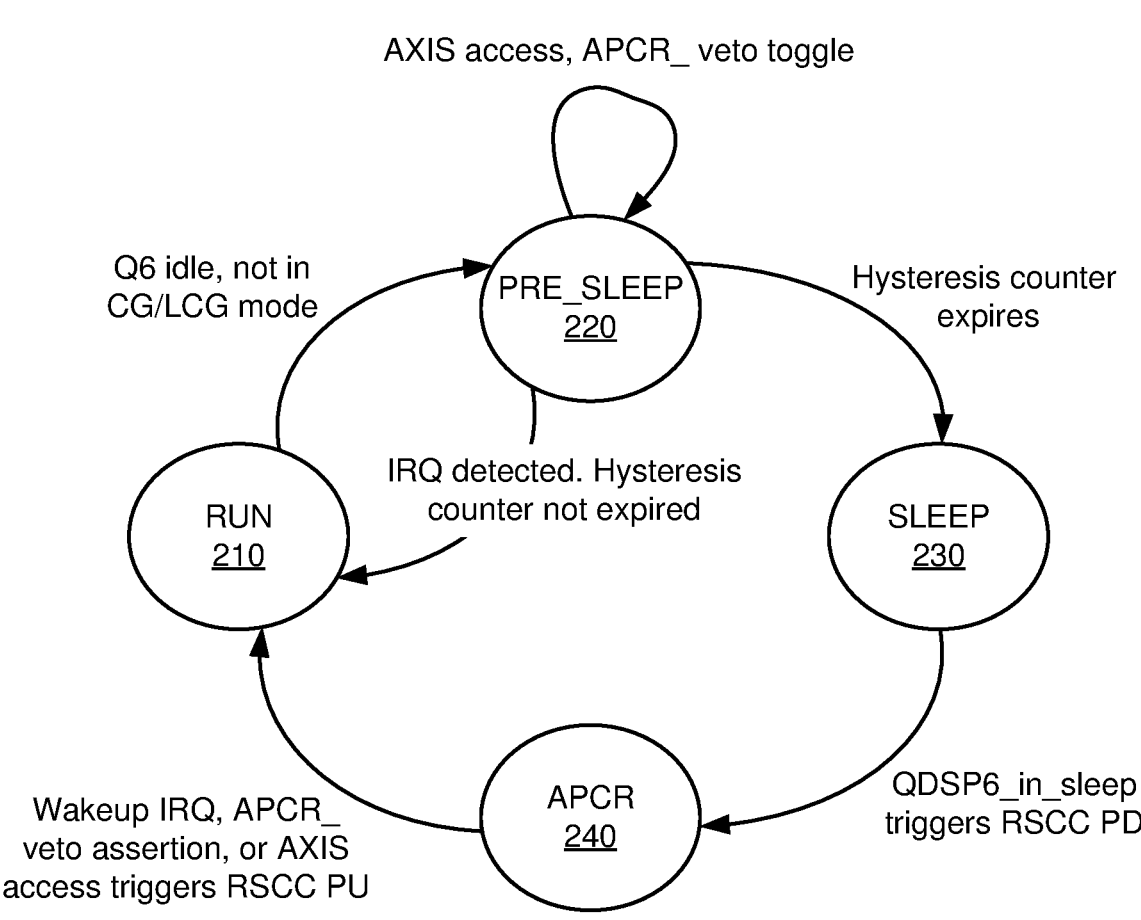

FIG. 2 illustrates an example of a state transition diagram 200. In one example, a run state 210 is a state where the processing engine is fully powered. In one example, a pre-sleep state 220 is a state which is entered when the processing engine is idle but is not in a clock gating state or a long clock gating state. In one example, a sleep state 230 is a transitory state which is entered if a hysteresis counter expires. In one example, once the SAPCR state is aggregated and the hysteresis counter expires, a sleep driver triggers a resource state controller (RSC) hardware sequencer of the SAPCR state in the processing engine. In one example, the final state is an automatic power collapse and restore (APCR) state 240, once the RSC hardware sequencer has completed. In one example, if any wakeup interrupt occurs, or if an APCR veto is asserted from the modem, or if any transaction from an Advanced extensible Interface (AXI) slave interface from the modem is activated, then the processing engine will revert to the run state 210.

In one example, the run state 210 is entered from the APCR state 240 if a wakeup interrupt request (IRQ) occurs, if an APCR_veto is asserted or if an Advanced extensible Interface (Slave) (AXIS) access triggers a Resource State Controller (Child) Power Up (RSCC PU). In one example, the run state 210 is entered from the pre-sleep state 220 if an interrupt request (IRQ) occurs and the hysteresis counter has not expired.

In one example, modem firmware clients from a modem offline block may access a cache memory, such as a tightly coupled memory (TCM) to store and read modem internal data. In one example, an indication framework from the modem offline block is needed prior to entry into the SAPCR state. In one example, a N-bit register may be used to store all firmware client APCR_veto votes. For example, the APCR_veto vote may be set to zero if the SAPCR state is allowed and may be set to one if the SAPCR state is not allowed. In one example, an AND operation of each bit of the APCR_veto votes may be used as an indication for the processing engine to enter into the SAPCR state.

In one example, an Advanced extensible Interface (Slave) (AXIS) access is used by a modem offline client to access processing engine core memories.

In one example, Resource State Controller (Child) Power Up (RSCC PU) is a startup state for the RSC. In one example, the RSC is a hardware sequencer which is executed while entering or exiting low power modes supported by the RSC. In one example, the RSCC PU may be invoked using a RSC child subsystem since the modem subsystem as a whole acts as a RSC parent subsystem which controls overall power states of the modem subsystem.

In one example, support for the SAPCR state may be provided by a processing engine but not optimally implemented without availability of a hysteresis counter which controls frequent state toggles. In one example, SAPCR state may be exercised during some communication scenarios (e.g., during physical downlink control channel (PDCCH) or physical downlink shared channel (PDSCH) scenarios) whenever processor threads are in an idle state for a sufficient time duration. In one example, SAPCR entry may be enhanced using data registers such as APCR_veto and Hysteresis_Counter. In one example, the Hysteresis_Counter register is an N-bit register (e.g., N=12) which stores hysteresis counter value. In one example, upon hysteresis counter expiration, the processing engine proceeds to the SAPCR state.

In one example, a hysteresis level may not be static (i.e., it may be dynamic) since its optimal value depends on dc power consumption and processor performance for various radio access technologies or scenarios. In one example, a lower hysteresis level may result in multiple SAPCR toggles in shorter idle periods which may degrade processor timeline and performance. In one example, a higher hysteresis level may result in less dc power savings in longer idle periods (e.g., for processor concurrencies or for a downlink control information (DCI) active grant with radio link monitoring (RLM). In one example, a steady state may occur during page monitoring or wait modes.

In one example, a dynamic hysteresis level may be required for certain scenarios where the processing engine is subject to multiple short idle durations. In one example, transition into the SAPCR state in these scenarios may not be optimal from a power consumption and stability perspective. In one example, processor concurrencies refers a scenario with concurrent use cases active where parallel, asynchronous threads may be utilized, dependent on task scheduling, and multiple short idle durations may result. For example, processor concurrencies may occur for voice and data, connected mode and neighbor measurements, etc.

In one example, if a hysteresis timer or a hysteresis level is static with no provision for dynamic reassignment for a processor utilization pattern (e.g., driven by event changes), dc power consumption and processor performance may be compromised due to the static hysteresis level. In one example, a lower hysteresis level (e.g., 10-20 microseconds) may be configured to allow frequent entry into the SAPCR state. For example, the lower hysteresis level may result in timeline issues (e.g., stability issues) due to frequency entry and exit of the SAPCR state when processor idle cycles are not expected to be higher (e.g., additional activity due to various radio access technologies or scenarios or concurrencies). In one example, a higher hysteresis level (e.g., 80-100 microseconds) may be configured to avoid frequent entry of the SAPCR state to avoid stability issues. However, the higher hysteresis level may not result in significant dc power savings since most idle cycles which are greater than 50 microseconds may not trigger a state change. In addition, there may be a delay in entry of the SAPCR state for higher idle cycles (e.g., greater than 100 microseconds) for cases where processor idle cycles are more frequent.

In one example, the SAPCR state also drives a Fal10 mode entry. And, in one example, an active low signal may be required to trigger the Fal10 mode which may be further activated by a power management unit (PMU). In one example, Fal10 mode refers to First access latency—10 microseconds, which is a system level low power mode. In one example, Fal10 mode may be exercised during SAPCR state boundaries. In one example, once the processing engine enters SAPCR state low power mode, it may release a Fal10 vote which is further aggregated by the PMU. In one example, based on the PMU aggregation of all Fal10 votes from every client, infrastructure elements, such as main memory (e.g., DDR memory), memory network on a chip (NOC), etc. may undergo power collapse to save additional dc power.

In one example, improved processor performance and lower de power consumption may be attained by incorporating an adaptive SAPCR state. In one example, the adaptive SAPCR state includes a dynamic hysteresis level which is based on a processor load which depends on one or more of the following: radio access technology, radio resource control (RRC) state, quantity of active scenarios, etc. In one example, error correction in a dynamic hysteresis calculation for the hysteresis level may improve accuracy of operation for dc power consumption without degrading processor performance.

In one example, the following Table 2 illustrates an example of a mapping between power modes and hysteresis level.

TABLE 2

| Power mode | Hysteresis level | Description |
|---|---|---|
| Power mode | L0 (<20 µs) | Page monitoring (steady state IDLE/connected), e.g., PDCCH monitoring, IDLE page wait, etc. |
| Nominal mode | L1 (20 to 50 µs) | Page monitoring with concurrency enabled (RLM, ARD evaluation, uplink reporting, etc.) e.g., PDCCH with serving/neighbor cell search & measurement, CQI/SRS reporting, etc., VOLTE-PDCCH state with voice RX/TX |
| Performance mode | L2 (70 to 100 µs) | Active grant state (PDSCH mode) e.g., DCI grant for active data, download or upload |
| Disable mode | L3 (>400 µs) | PDSCH with multi-level concurrency (DSDA, PDSCH with connected mode RLM measurements, etc.) e.g., DSDA- voice + data, data/voice call with neighbor measurements, etc. |

Wherein:
RLM=radio link monitoring
ARD=access restriction data
CQI=channel quality indicator
SRS=sounding reference signal
VOLTE=voice over LTE
DCI=downlink control information
DSDA=dual SIM dual active
PDCCH=physical downlink control channel
PDSCH=physical downlink shared channel
SIM=subscriber identity module In one example, a low power manager for a processing engine (e.g., DSP) may be implemented. In one example, an enhanced dynamic hysteresis module within the low power manager may dynamically calculate a hysteresis level for SAPCR state entry based on several input parameters such as:

radio access technology (e.g., 5G NR vs. 4G LTE)
   modem RRC state-connected/idle/acquire/initialize data/voice state or page monitoring or wait state
   signal/noise ratio (SNR) and multi-input multi-output (MIMO) state determined in ARD evaluation (e.g., ARD switch from 4Rx to 2Rx/1Rx in PDCCH/IDLE)
   layer 2 and layer 3 concurrency detection for all radio link monitoring activities such as cell search/measurement/reporting, etc.
   multi-technology and multi-mode detection In one example, the low power manager may incorporate dynamic hysteresis estimation and an error correction algorithm to consider all inputs and determine hysteresis levels. For example, software may integrate a frequency plan and a concurrency manager as part of the inputs.

In one example, a level shifter within the low power manager may increase or decrease hysteresis levels accordingly. In one example, a final hysteresis level may be sent to a hardware-based framework engine (e.g., with enhanced CESTA) to apply a sleep driver which exercises the SAPCR state accordingly.

In one example, client-side state aggregator (CESTA) is a hardware element which assists in local resource (e.g., voltage, clocks, data bus bandwidth, etc.) aggregation within a subsystem. In one example, since CESTA is hardware aggregation logic, state transitions may occur faster. In one example, if the hysteresis counter is dynamically changed using software, the additional software overhead results in increased latency. In one example, usage of CESTA further reduces voting latency of the dynamic hysteresis counter. In one example, enhanced CESTA refers to a modification of CESTA where the hysteresis counter is dynamically tuned for the processing engine.

In one example, timeline and performance metrics may be used further to improve the hysteresis level and counter value to avoid performance issues while saving dc power in all available opportunities. In one example, the low power manager may incorporate closed loop feedback to initialize dynamic hysteresis with predetermined values stored in a look up table (LUT) and execute error correction to improve accuracy.

Figure 3:
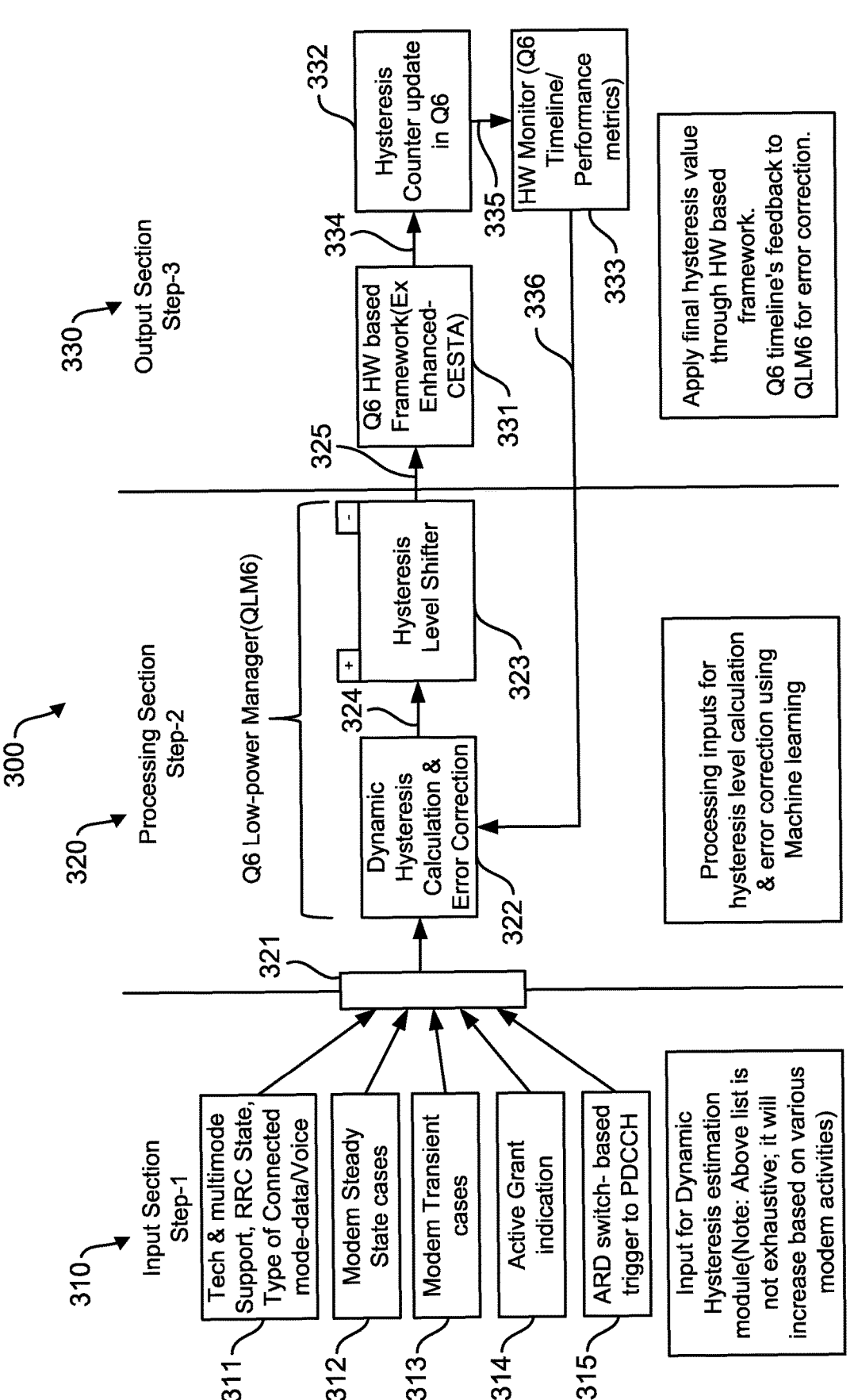
FIG. 3 illustrates an example of a low power manager.

FIG. 3 illustrates an example of a low power manager 300. In one example, the low power manager includes an enhanced dynamic hysteresis module. In one example, the low power manager 300 includes three sections: an input section 310, a processing section 320 and an output section 330. In one example, the low power manager 300 implements dc power management of other elements such as a radio frequency (RF) section (not shown) and a modem (not shown). For example, the RF section may include a transmit subsystem with a transmit waveform and a receive subsystem with a receive waveform. For example, the RF section may be used for wireless communication to external entities. For example, the modem may include a modulator for transmit waveform generation and a demodulator for receive waveform reception. For example, the modulator may be used to convert a transmit digital data stream to the transmit waveform. For example, the demodulator may be used to convert the receive waveform into a receive digital data stream.

In one example, the input section 310 of the low power manager 300 provides a plurality of inputs to the processing section 320 for dynamic hysteresis estimation. In one example, the plurality of inputs includes input parameters 311 such as radio access technology and multimode support, RRC state, type of connected mode for data/voice, etc. In one example, the input section 310 includes modem steady state cases 312, modem transient cases 313, active grant indication 314, access restriction data (ARD) switch-based trigger to physical downlink control channel (PDCCH) 315, etc. In one example, the plurality of inputs may include other inputs not listed above.

In one example, the processing section 320 of the low power manager 300 accepts one or more of the plurality of inputs from the input section 310 at an input interface 321 for hysteresis level calculation and error correction using machine learning (ML). In one example, the input interface 321 selects one input from the plurality of inputs and sends the selected input to a dynamic hysteresis calculation and error correction module 322. In one example, the dynamic hysteresis calculation and error correction module 322 generates an initial hysteresis level 324 and sends it to a hysteresis level shifter module 323.

In one example, the hysteresis level shifter module 323 adjusts the initial hysteresis level 324 to generate an adjusted hysteresis level 325. In one example, the initial hysteresis level 324 is mapped to a closest hysteresis value within a predefined hysteresis table (e.g., Table 2). In one example, the adjusted hysteresis level 325 is higher than the initial hysteresis level 324. In one example, the adjusted hysteresis level 325 is lower than the initial hysteresis level 324. In one example, the processing section 320 sends the adjusted hysteresis level 325 to the output section 330.

In one example, the output section 330 of the low power manager 300 accepts the adjusted hysteresis level 325 and sends it to a hardware-based framework engine 331 (e.g., with enhanced CESTA) to apply a sleep driver which exercises the SAPCR state accordingly. In one example, the framework engine 331 sends an update signal 334 to a hysteresis counter 332 to generate an updated hysteresis level 335. In one example, the update signal 334 is a hysteresis counter value voted by a hardware voting framework, such as enhanced CESTA.

In one example, the updated hysteresis level 335 is sent to a timeline/performance monitor 333. In one example, the timeline/performance monitor 333 monitors a relationship between processor performance and one or more hysteresis levels and generates a hysteresis feedback value 336. In one example, the one or more hysteresis levels may include one or more of the following: initial hysteresis level 324, adjusted hysteresis level 325, updated hysteresis level 335.

In one example, the hysteresis feedback value 336 is fed back to the dynamic hysteresis calculation and error correction module 322 in the processing section 320. In one example, the dynamic hysteresis calculation and error correction module 322 uses the hysteresis feedback value 336 to generate a corrected hysteresis level which is sent to the hysteresis level shifter 323. In one example, the corrected hysteresis level is adjusted by the hysteresis level shifter module 323 to generate an adjusted corrected hysteresis level. In one example, the feedback operation of FIG. 3 continues.

In one example, the following Table 3 illustrates the plurality of inputs for the input section 310 of the low power manager 300.

TABLE 3

| label | parameters |
|---|---|
| 1 | Type of radio access technology (e.g., 5G NR, 4G LTE, etc.) |
| 2 | Modem RRC state: connected/IDLE/ACQ/INIT etc., for any radio access technology |

TABLE 3-continued

| label | parameters |
|-------|-----------|
| 3 | Type of traffic: data/voice/page decode/control signal |
| 4 | SNR & MIMO state determined in ARD evaluation (e.g., ARD transitions due to traffic or RF conditions) |
| 5 | Modem layer 2 and layer 3 concurrency detection (e.g., radio link monitoring- cell search/measurement/ reporting & uplink/downlink reporting, RF layer & state evaluation, etc.) |
| 6 | Multi-technology & multi-mode detection (e.g., DSDS/ DSDA/NSA) |
| 7 | RF signal condition: SNR/RSRP |

Wherein:

MIMO=multi-input multi-output

ARD=access restriction data

DSDS=dual SIM dual standby

DSDA=dual SIM dual active

NSA=non-standalone

SNR=signal/noise ratio

RSRP=reference signal received power

In one example, there may be other modem and RF section parameters which may also be part of the plurality of inputs for the input section 310 of the low power manager 300 to configure the hysteresis level. For example, the plurality of inputs for the input section 310 may be stored in a look up table (LUT) or in a database in main memory.

In one example, a hysteresis level configuration may be based on scenario changes in the modem and the RF section in runtime. For example, the hysteresis level configuration may include a level 0 (L0) hysteresis level, a level 1 (L1) hysteresis level, a level 2 (L2) hysteresis level, a level 3 (L3) hysteresis level, etc. In one example, FIG. 4 illustrates an example of a mapping 400 from a modem and RF section scenario to a hysteresis level configuration. In one example, the mapping illustrated in FIG. 4 is not exhaustive. In one example, the mapping may incorporate finer granularity with additional intermediate modes.

In one example, a 5G NR PDCCH state (e.g., with connected mode page monitoring) is a baseline scenario which maps into a L0 hysteresis level. In one example, if any L2 level concurrency event arrives, then the initial hysteresis level 324 is set to a L1 hysteresis level based on scenario expectations. In one example, subsequent to the hysteresis level setting, the hysteresis level is sent to the hysteresis level shifter module 323. In one example, the hysteresis level shifter module 323 adjusts the initial hysteresis level 324 to generate an adjusted hysteresis level 325.

In one example, a final aggregated hysteresis level may be updated to a hardware-based module (e.g., the hardware-based framework engine 331) to update the hysteresis counter 332. In one example, a hardware monitor (e.g., the timeline/performance monitor 333) tracks timeline and performance metrics in terms of a number of null SAPCR counts (e.g., % NULL SAPCR count) and in terms of a variation in performance metrics (e.g., million packets per second (MPPS) and cycles per packet (CPP)). In one example, timeline and performance metrics may be stored in a local database. In one example, MPPS and CPP are performance metrics which monitor processor load (i.e., a higher processor load results in higher values for MPPS and CPP). In one example, the performance metrics are monitored to update the hysteresis counter dynamically.

In one example, the SAPCR state may be categorized as a null SAPCR state if a net SAPCR state duration is less than a low threshold (e.g., Thresh_Low). For example, the low threshold may be a variable with a configurable range of 10 to 30 microseconds. In one example, the net SAPCR state duration is equal to a total SAPCR state duration after hysteresis minus a sum of SAPCR state entry duration and exit duration.

In one example, the following Table 4 illustrates a sample local database used by the hardware monitor to hold and iteratively update to compare with a real time monitoring data.

TABLE 4

| Use case | Performance metrics | % NULL SAPCR count | Hysteresis level |
|----------|--------------------|--------------------|------------------|
| x | L0.MPPS*L0.CPP | ~10% | L0 |
| x | L1.MPPS*L1.CPP | ~8% | L1 |
| x | L2.MPPS*L2.CPP | ~5% | L2 |
| x | L3.MPPS*L3.CPP | ~1% | L3 |

In one example, initial training samples for the sample local database above to a machine learning (ML) algorithm may be collected in internal testing or may be based on field statistics for new scenarios in legacy targets. In one example, initial training samples may be executed at run time for fewer samples. In one example, the ML algorithm may adjust the hysteresis level for a given use case and may predict an error (e.g., null SAPCR state). For example, the initial training samples may be used by the ML algorithm to suggest an accurate hysteresis level for the given use case.

In one example, an iterative learning algorithm may be used to compute an APCR hysteresis level. In one example, inputs to the iterative learning algorithm are: radio access technology (e.g., 5G NR, 4G LTE, etc.), multi-mode state (e.g., dual SIM/single SIM), RRC state (e.g., connected/ idle), uplink/downlink grants, user equipment antenna state (e.g., 1Rx/2Rx/4Rx), concurrency, epsilon (e.g., error toler-ance). In one example, output of the iterative learning algorithm may be hysteresis level (e.g., L0 to L5). In one example, the initial value of epsilon may be unity (i.e., 1). In one example, epsilon (i.e., error tolerance) relates to iterative learning algorithm accuracy. In one example, epsilon is updated after every algorithm iteration. In one example, once epsilon is below a predefined error tolerance threshold level, the iterative learning algorithm updating is terminated (i.e., the iteration loop is terminated).

In one example, the iterative learning algorithm has the following steps:

Do step 1, 2, 3 while epsilon ≤1

1. Initial hysteresis based on ML inputs=Lx
   i. For example, if radio access technology=5G NR, mode=single SIM active, RRC state=idle, no UL/D? grants, antenna state=1Rx, no concurrency, then select L0 hysteresis level
   ii. Key parameters which impact hysteresis in runtime defined in multilevel LUT: concurrency, multi-mode/multi-tech, radio access technology, UL/DL grants, antenna state, RRC state
   iii. Low power manager may decide hysteresis level based on above parameters by looking into multi-level LUT
2. Hardware-based hysteresis counter voting occurs, Lx value is updated as hysteresis for APCR state.
3. Hardware monitor in low power manager detects error based on % NULL SAPCR and performance metrics (MPPS & CPP)

i. Error detection by null APCRs and performance metric monitoring by hardware monitor in iterative method.

a) If error >threshold, epsilon=epsilon/10 and shift Lx by one higher level.

b) Else if it stays below threshold (e.g., do not change Lx, exit loop)

FIG. 5 illustrates an example flow diagram 500 for power management of a processor. In block 510, provide a plurality of inputs for dynamic hysteresis estimation. In one example, the plurality of inputs is provided for dynamic hysteresis estimation. In one example, the plurality of inputs includes radio access technology, multimode support, radio resource control (RRC) state, type of connected mode for data/voice, etc. In one example, the plurality of inputs includes modem steady state cases, modem transient cases, active grant indication, access restriction data (ARD) switch-based trigger to physical downlink control channel (PDCCH), etc. In one example, the plurality of inputs may include other inputs not listed above.

In block 520, select one or more inputs from the plurality of inputs and send the one or more inputs to a dynamic hysteresis calculation and error correction module for a hysteresis calculation and error correction. In one example, the one or more inputs from the plurality of inputs is selected. And, in one example, the one or more inputs is sent to a dynamic hysteresis calculation and error correction module for a hysteresis calculation and error correction.

In block 530, compute an initial hysteresis level based on the one or more inputs from the plurality of inputs. In one example, the initial hysteresis level is computed based on the one or more inputs from the plurality of inputs. In one example, the initial hysteresis level includes the hysteresis calculation and error correction.

In block 540, adjust the initial hysteresis level to generate an adjusted hysteresis level. In one example, the initial hysteresis level is adjusted to generate an adjusted hysteresis level. In one example, the adjusted hysteresis level is higher than the initial hysteresis level. In one example, the adjusted hysteresis level is lower than the initial hysteresis level. In one example, the adjustment is performed by a hysteresis level shifter module.

In block 550, process the adjusted hysteresis level (with a hardware-based framework engine) to exercise an automatic power collapse and restore (APCR) state to generate an update signal. In one example, the adjusted hysteresis level is processed (with a hardware-based framework engine) to exercise an automatic power collapse and restore APCR) state to generate an update signal. In one example, the APCR state is a short APCR (SAPCR) state.

In block 560, generate an updated hysteresis level based on the update signal. In one example, the updated hysteresis level is generated based on the update signal.

In block 570, monitor a relationship between processor performance and one or more hysteresis levels, and generate a hysteresis feedback value. In one example, the relationship between processor performance and one or more hysteresis levels is monitored, and the hysteresis feedback value is generated. In one example, the hysteresis feedback value is generated based on the monitored relationship. In one example, the one or more hysteresis levels may include one or more of the following: initial hysteresis level 324, adjusted hysteresis level 325, updated hysteresis level 335.

In block 580, generate a corrected hysteresis level based on the hysteresis feedback value. In one example, the corrected hysteresis level is generated based on the hysteresis feedback value. In one example, the hysteresis feedback value is fed back after monitoring the relationship between processor performance and hysteresis level. In one example, the hysteresis feedback value is provided as a feedback input to the dynamic hysteresis calculation and error correction module 322 shown in FIG. 3.

In block 590, adjust the corrected hysteresis level to generate an adjusted corrected hysteresis level. In one example, the corrected hysteresis level is adjusted to generate the adjusted corrected hysteresis level. In one example, the adjustment is performed by the hysteresis level shifter module. In one example, the feedback operation continues.

In one aspect, one or more of the steps for providing power management of a processor in FIG. 5 may be executed by one or more processors which may include hardware, software, firmware, etc. The one or more processors, for example, may be used to execute software or firmware needed to perform the steps in the flow diagram of FIG. 5. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a digital signal processor (DSP) configured to receive a power state message and further configured to set a power mode based on the power state message;
a central processing unit (CPU) coupled to the DSP, the CPU configured to execute a power management of the DSP and further configured to select the power state message, wherein the power state message includes a hysteresis level; and
a memory coupled to the CPU, the memory configured to store data, wherein the data is used to execute the power management,
wherein the central processing unit (CPU) is further configured to:
adjust an initial hysteresis level to generate an adjusted hysteresis level; and
use a hardware-based framework engine to process the adjusted hysteresis level and to exercise an automatic power collapse and restore (APCR) state to generate an update signal.

2. The apparatus of claim 1, further comprising a power supply, wherein the power supply is housed within the digital signal processor (DSP).

3. The apparatus of claim 2, wherein the CPU is further configured to send the power state message to the power supply.

4. The apparatus of claim 3, wherein the memory is further configured to store one or more instructions to execute the power management of the digital signal processor (DSP).

5. The apparatus of claim 3, wherein the power mode is associated with the digital signal processor (DSP).

6. The apparatus of claim 1, wherein the central processing unit (CPU) is further configured to generate an updated hysteresis level based on the update signal.

7. The apparatus of claim 6, wherein the central processing unit (CPU) is further configured to monitor a relationship between a performance of the digital signal processor (DSP) and one or more of the following: the initial hysteresis level, the adjusted hysteresis level, the updated hysteresis level.

8. The apparatus of claim 7, wherein the central processing unit (CPU) is further configured to generate a hysteresis feedback value based on the relationship.

9. The apparatus of claim 8, wherein the central processing unit (CPU) is further configured to generate a corrected hysteresis level based on the hysteresis feedback value.

10. The apparatus of claim 1, wherein the central processing unit (CPU) is further configured to adjust the corrected hysteresis level to generate an adjusted corrected hysteresis level.

11. The apparatus of claim 10, wherein the hysteresis level is the adjusted corrected hysteresis level.

12. A method comprising:
monitoring a relationship between a performance of a processor and one or more hysteresis levels for generating a hysteresis feedback value based on the relationship;
generating a corrected hysteresis level based on the hysteresis feedback value;
adjusting the corrected hysteresis level to generate an adjusted corrected hysteresis level;

generating an updated hysteresis level based on an update signal; and processing an adjusted hysteresis level to exercise an automatic power collapse and restore (APCR) state to generate the update signal, wherein the processing uses a hardware-based framework engine.

13. The method of claim 12, further comprising adjusting an initial hysteresis level to generate the adjusted hysteresis level.

14. The method of claim 13, wherein the one or more hysteresis levels include one or more of the following: the initial hysteresis level, the adjusted hysteresis level and the updated hysteresis level.

15. The method of claim 13, further comprising computing the initial hysteresis level based on one or more inputs from a plurality of inputs.

16. The method of claim 15, further comprising:

selecting the one or more inputs from the plurality of inputs; and sending the one or more inputs to a dynamic hysteresis calculation and error correction module for a hysteresis calculation and error correction.

17. The method of claim 16, wherein the plurality of inputs includes one or more of the following: a radio access technology, a multimode support, a radio resource control (RRC) state, or a type of connected mode for data or voice.

18. The method of claim 16, wherein the plurality of inputs includes one or more of the following: a modem steady state case, a modem transient case, an active grant indication, or an access restriction data (ARD) switch-based trigger to physical downlink control channel (PDCCH).

19. An apparatus for providing power management of a processor, the apparatus comprising:

means for monitoring a relationship between a performance of a processor and one or more hysteresis levels for generating a hysteresis feedback value based on the relationship;

means for generating a corrected hysteresis level based on the hysteresis feedback value;

means for adjusting the corrected hysteresis level to generate an adjusted corrected hysteresis level; and means for processing an adjusted hysteresis level to exercise an automatic power collapse and restore (APCR) state to generate an update signal.

20. The apparatus of claim 19, wherein the means for processing is configured to use a hardware-based framework engine to process the adjusted hysteresis level.

21. The apparatus of claim 19, further comprising means for generating an updated hysteresis level based on the update signal.

22. The apparatus of claim 21, further comprising:

means for adjusting an initial hysteresis level to generate the adjusted hysteresis level; and means for computing the initial hysteresis level based on one or more inputs from a plurality of inputs, wherein the plurality of inputs includes one or more of the following: a radio access technology, a multimode support, a radio resource control (RRC) state, a type of connected mode for data or voice, a modem steady state case, a modem transient case, an active grant indication, or an access restriction data (ARD) switch-based trigger to physical downlink control channel (PDCCH).

23. The apparatus of claim 22, wherein the one or more hysteresis levels include one or more of the following: the initial hysteresis level, the adjusted hysteresis level and the updated hysteresis level.

24. A non-transitory computer-readable medium storing computer executable code, operable on a device comprising at least one processor and at least one memory coupled to the at least one processor, wherein the at least one processor is configured to implement power management of a processor, the computer executable code comprising:

instructions for causing a computer to monitor a relationship between a performance of a processor and one or more hysteresis levels for generating a hysteresis feedback value based on the relationship;

instructions for causing the computer to generate a corrected hysteresis level based on the hysteresis feedback value;

instructions for causing the computer to adjust the corrected hysteresis level to generate an adjusted corrected hysteresis level; and instructions for causing the computer to generate an updated hysteresis level based on an update signal;

instructions for causing the computer to process an adjusted hysteresis level to exercise an automatic power collapse and restore (APCR) state to generate the update signal, wherein the processing uses a hardware-based framework engine; and instructions for causing the computer to adjust an initial hysteresis level to generate the adjusted hysteresis level.

* * * * *